United States Patent Office 3,732,249
Patented May 8, 1973

3,732,249
ACIDIC CITRATE OF BUFOTENIDINE AND
ITS PREPARATION
Otoharu Ishizaka, Tokyo, Japan, assignor to Kyushin
Seiyaku Kabushiki Kaisha, Tokyo, Japan
No Drawing. Filed Jan. 14, 1971, Ser. No. 106,528
Int. Cl. C07d 27/56
U.S. Cl. 260—326.15                               8 Claims

ABSTRACT OF THE DISCLOSURE

An acidic citrate of the compound bufotenidine of the formula

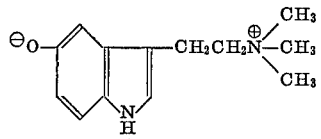

is provided having improved stability and in flavorless and readily dissolvable form. The process comprises (a) immersing fine particles of the crude drug *Bufonis venenum* with ethyl acetate for at least six hours at room temperature;

(b) immersing the residue separated from said ethyl acetate with from about 15 to about 25 parts of an alcohol at a temperature below 40° C.;

(c) immersing the residue of the resultant alcoholic solution in water at room temperature in an atmosphere devoid of light for 1–3 hours;

(d) removing the residue from the resultant aqueous solution and adding to said aqueous solution an alcoholic solution of picric acid at a temperature of 15° to 40° C., the resultant mixture thereafter standing in a cool atmosphere devoid of light for at least 24 hours;

(e) collecting the resulting precipitate of (d) and adding thereto a solution of dilute hydrochloric acid, thereafter adding an ether solution thereto and allowing the resultant mixture to stand quietly;

(f) separating the ether phase from the mixture of (e) to yield an aqueous solution, to which are successively added citric acid and sodium hydrogen carbonate; and (g) removing the water from the resultant solution to yield said acidic citrate.

BACKGROUND OF THE INVENTION

The present invention relates to a method for preparing a cardiotonic Bufotenidine from the crude drug *Bufonis venenum* by means of composition of citric acid and sodium chloride, with a relatively high purity and stability of the product at low cost and high yield.

The crude drug *Bufonis venenum* is a dried and crystallized product of the endocrinal secretion from the frogs belonging to the species Bufo and is well-known to possess cardiotonic, diuretic and stimulant effects. It has also been known that this crude drug contains fat solubles of Bufosteroids, such as Bufotalin, Resibufogenin and acidic water solubles, such as Epirenamin and Bufotenidine, which are recognized as cardiotonic substances. Among these cardiotonic substances, those of Bufosteroids have already been prepared from the crude drug *Bufonis venenum* and prepared as cardiotonics.

As for Bufotenidine, a method for preparing it in the form of a picrate of Bufotenidine from the crude drug *Bufonis venenum* has theoretically been found, but to the best knowledge of the present inventor, there is yet established no industrial method for preparing it as a medicament applicable to human bodies, nor any method for preparing it as a non-toxic preparation with stable efficacy.

The primary objective of the present invention is to offer a practical method for preparing Bufotenidine from the cardiotonic contents of the crude drug *Bufonis venenum* as an acidic citrate with stable medicinal effect.

Another objective of the present invention is to offer a method for preparing the end product at maximum yield per unit of the crude drug *Bufonis venenum* used and with minimum loss during the production process.

Still another objective of the present invention is to yield the end product as economically and efficiently as possible.

The other objectives and effects of the present invention will be understood by reading the following description of the invention.

SUMMARY OF THE INVENTION

The method according to the present invention comprises of the following steps:

(a) immerse fine particles of *Bufonis venenum* in ethyl acetate for a necessary period of time at room temperature;

(b) immerse the residue obtained after removal of ethyl acetate in an alcoholic solution for the necessary period of time at room temperature, during which time the alcohol is renewed several times;

(c) immerse the residue obtained after removal of alcohol in water in several doses for the necessary period to prepare the water solubles;

(d) add an alcoholic solution of picric acid to all the aqueous solutions deprived of the residue;

(e) add dilute hydrochloric acid to the resulting precipitate and further add ethyl ether thereto;

(f) after a period of quiet standing, separate the mixture into ethyl ether and aqueous solution;

(g) add citric acid to the thus obtained aqueous solution and then add sodium hydrogen carbonate thereto; and (h) dry the thus obtained solution to yield the end product, i.e., a cardiotonic composite substance of Bufotenidine, citric acid and sodium chloride.

DETAILED DESCRIPTION OF THE INVENTION

The above summary described the basic steps of the production process according to the present invention.

The reason for immersing the crude drug *Bufonis venenum* in ethyl acetate is that ethyl acetate, being non-toxic, noninflammable and available at low cost, is found most suitable for industrial mass production and for pre-treatment to eliminate unnecessary substances prior to preparation of the end product.

Thus, the crude drug *Bunfonis venenum* is immersed in ethyl acetate at room temperature for the necessary duration during which ethyl acetate is desirably to be renewed several times, so that the useless substances in the crude drug *Bufonis venenum* can be substantially eliminated, thereby facilitating the subsequent preparation of the end product.

The amount, temperature, immersion period and number of renewing times of ethyl acetate in which to immerse the crude drug *Bufonis venenum* should be selected such that the unnecessary contents of the crude drug *Bufonis venenum* can be eliminated as far as possible at high efficiency.

The most desirable conditions are: to use ethyl acetate of Class 1 reagent quality 15–25 times as much by weight of the crude drug *Bufonis venenum*, the temperature being less than 40° C., or preferably around 25° C. and the immersion period being 6–12 hours; separate the solution and the insolubles by some adequate means, for instance, the conventional centrifugal separator; and obtain the insolubles. The above step is to be repeated two or three times. The insolubles thus obtained are immersed in alcohol at room temperature for the necessary period, thereby leaching the end product out of the crude drug *Bufonis venenum*. Thereby it is desirable to use alcohol of as high purity as possible, for instance, over 90% pure alcohol. Of course what is called the alcohol here refers to methanol, ethanol or any of the other low class alcohols, but from a standpoint of cost saving in mass production, methanol, the cheapest of all, is recommendable.

The preparation of the end product should take place under the necessary and sufficient conditions with respect to the period of immersing the abovementioned insolubles in alcohol, the amount, temperature and renewal frequency of alcohol; and preferably under the conditions: the alcohol 15–25 times as much in weight as the insolubles, the immersion period 6–24 hours, the temperature below 40° C. or preferably around 25° C., and the step to be repeated two or three times to leach out the end product in the alcohol.

All the alcoholic solutions obtained in all steps are collected and by removing the alcohol from them, the alcoholic preparation is yielded. Thereby the alcohol is removed by any known method by evaporation and drying under the reduced pressure at a temperature lower than 40° C.

The preparation is split into several parts, each of which is immersed in water for the necessary period to leach out the water solubles, i.e. the end product. Thereby the immersion should not be too long, otherwise an increased frequency of contact with air would deteriorate the end product. Thus, the adequate duration of immersion is 1–3 hours; and the immersion should take place at a room temperature lower than 40° C., shielded from direct sunlight. Ideally, the immersion can take place most effectively in a nitrogen stream.

As for the water, its total amount is 10–20 times as great by weight as the preparation. The water is split into 3–4 parts, each of which is to be used for repeated immersion to assure perfect leaching of water solubles.

The aqueous solution obtained is filtered or charged to a high-speed centrifugal separator to separate it from the residue; and the remaining solution is concentrated by some known method, such as lyophilization or depressured drying at below 40° C. to such an extent that the added water is almost removed.

The concentrated preparation is mixed with a hot saturated ethanol solution of picric acid; and after quiet standing, picrates of Bufotenidine and Epirenamin are precipitated. It is for reasons of nontoxicity and simplicity of manufacture that ethanol has been selected for use; use of methanol or any other alcohol should be avoided, if possible.

The temperature of ethanol should be such that the picric acid can be easily dissolved and the preparation is not crystallized; for example, 15–40° C. is adequate and the volume of ethanol should be about equal to that of the preparation.

Quiet standing of the mixture of the preparation and said hot ethanol solution should desirably last for 24–48 hours in a place of 10–25° C. temperature shielded from sunlight, so that the precipitate can be sufficiently obtained and it does not deteriorate. The precipitate is separated by filtering or the like and it is recrystallized by addition thereto of hydrated acetone and composed of 3 parts acetone, 7 parts water in an amount of 7–12 times as great by weight as the precipitate, thereby eliminating the impurities and refining the precipitate.

The recrystallized precipitate is suspended in dilute hydrochloric acid; the suspension is mixed with ether and well shaken; and thereafter picric acid is removed and the solution is left in quiet standing for complete leaching.

Thereby the dilute hydrochloric acid should be of 4–6% by weight concentration and 36–54 parts by weight or slightly more of it per 0.205 part of the precipitate should be used to assure perfect suspension of the precipitate in dilute hydrochloric acid.

Prior to mixing with ether, the suspension may be separated by a separating funnel to eliminate slight inclusion of impurities and thereby enhance the purity of the suspension, but this step can be omitted.

The ether used here should be as pure as possible, desirably special grade ether, so that an end product of high qaulity may be obtained and the picric acid in the suspension may be completely leached out.

If too much ether is employed, the moisture from the water layer may be absorbed and thereby the yield of the end product may drop through its dissolution in the absorbed water. On the contrary, if too little ether is employed, the leaching of the picric acid will be imperfect. For these reasons, the adequate amount of ether will be 2.5–3.5 times the weight of the crude drug *Bufonis venenum* used. As described above, after addition of dilute hydrochloric acid and ether to the precipitate, the solution is well shaken and left in quiet standing for 0.5–1 hour.

Through quiet standing, the solution is separated into two layers, from which the water layer is removed and mixed with ether in the same way as above to be shaken an appropriate number of times (preferably 4–6 times) and left in quiet standing, thereafter to be separated again. This process is repeated until all of the picric acid is leached out in ether and removed.

The aqueous solution thus obtained, i.e., a hydrochloric acid aqueous solution of Bufotenidine is mixed with citric acid in the same mol weight as, or more than, that of hydrochloric acid or of the Bufotenidine in said aqueous solution; then this mixture is further mixed with sodium hydrogen carbonate in the same mol weight as that of hydrochloric acid in said aqueous solution, and well blended. Removal of water content from the mixture yields the end product.

Thereby the addition of citric acid to the aqueous solution is specified as either the same mol weight as, or more than, that of hydrochloric acid in the aqueous solution or the same mol weight as, or more than, that of Bufotenidine, because the end product can be obtained either way. However, in terms of the purity of the end product, the results are better when the same mol weight as, or more than, that of Bufotenidine is added. Theoretically speaking, just the same mol weight would be sufficient, but addition in slight excess prevents production loss; thus, the appropriate range of addition is from the same mol weight to a double mol weight.

Water removal may be accomplished by any known method, but from the nature of the substance it is advisable to avoid sunlight, high temperature and the air contact, the most desirable method being lyophilization. Another recommendable method is to dry in a nitrogen stream at low temperature, shielded from the light.

It has been discovered that the objective of the present invention may also be attained by the following method.

In the above-mentioned method, the useless solubles in the crude drug *Bufonis venenum* are eliminated by means of ethyl acetate and then the insolubles are directly immersed in alcohol. In a new method discovered, chloroform is added to the insolubles remaining after removal of useless ethyl acetate-solubles from the crude drug *Bufonis venenum* and the solution is left in quiet standing to prepare small amounts of unncessary substances which are insoluble in ethyl acetate; and from the insolubles obtained after filtering the chloroform is distilled. The resulting substance is immersed in alcohol in the same way as in the first method; the end product is leached in the alcohol; and then, through evaporation and drying, an alcoholic preparation is yielded.

Acetone is added to said alcoholic preparation to eliminate therefrom unnecessary content which is soluble into acetone and at the same time to facilitate the treatment following the step of rendering the alcoholic preparation non-viscous.

Any remained acetone is evaporated from the acetone-insoluble residue. Thereupon, in the same way as in the first method, water is added to the residue to dissolve the water-solubles and separate an aqueous solution. The aqueous solution is concentrated and the concentrated preparation thus obtained is mixed with a hot ethanol solution of saturated picric acid, thereby precipitating picrates of Bufotenidine and Epirenamin. Through addition of hydrated acetone, this precipitate is recrystallized and through further addition of dilute hydrochloric acid and ether the picric acid is removed. The aqueous solution left is mixed first with citric acid and then with sodium hydrogen carbonate to neutralize the free hydrochloric acid and to eliminate the water and yield the end product.

According to the second method, the amount of chloroform to be added to the ethyl acetate-insolubles and the length of quiet standing time after the addition of chloroform depend on the amount of useless contents soluble in chloroform in the ethyl acetate insolubles, but it is sufficient that the amount of chloroform is just as much, and the period of quiet standing is just as long, as required for preparation of the useless contents.

Therefore, addition of chloroform of Class 1 Reagent grade in an amount of 5–20 times as great by weight as the ethyl acetate insolubles and 6–24 hours of quiet standing is enough for the purpose.

After quiet standing, the solution is filtered and the residue is washed with a little more addition of chloroform; then all of the chloroform insoluble residue is dried by evaporating any remaining chloroform therefrom. Distillation or evaporation may be done by allowing the solutions to dry naturally, but reduced pressure drying at less than 30° C. is advisable for the purpose of shortening the processing time and avoiding deterioration of the product.

The amount of acetone to be added; the duration, frequency and temperature of immersion should be such that the quality of the end product is good; the yield of production is high; the acetone-solubles are sufficiently prepared; the viscosity of the alcoholic preparation can be reduced; and the process can be economically carried out.

With all these conditions considered it would be advisable to use acetone of higher than Class 1 Reagent quality in approximately the same quantity·as the crude drug *Bufonis venenum*; immerse at less than 30° C., or preferably at 10–25° C., for a period of 2–6 hours, during which time the same amount of acetone is to be renewed two or three times at the same temperature.

Evaporation and drying of any acetone from the residue may be done conventionally under reduced pressure at a temperature lower than 30° C.

The steps to yield the end product from the preparation according to the second method are identical with the corresponding steps according to the first method.

The effects of the present invention have been verified by various tests and research, a few examples of which are cited below.

EXAMPLE 1

Fine particles of crude drug *Bufonis venenum* 100 parts by weight were immersed at 25° C. for 10 hours in 20 times as much by weight of ethyl acetate of Class 1 Reagent quality. In the meantime, ethyl acetate in the same amount at the same temperature was renewed twice.

Next, using a centrifugal separator, the solution and the residue were separated. The residue was treated twice in the same way as above to prepare the ethyl acetate insolubles.

The thus obtained insolubles were mixed with methanol of Class 1 Reagent quality in amount 20 times as much by weight as the residue; and they were thus immersed at 30° C. for 10 hours. After immersion, methanol and the methanol-insoluble residue were separated by a centrifugal separator and the residue was prepared three times in the same way as above.

Then all the methanol preparations were gathered in a depressured still to distill methanol at 30° C. and at a reduced pressure of 10 mm. Hg, thereby producing a preparation.

The obtained preparation was immersed in water in an amount 5 times as much by weight as the preparation; and in this state it was left for two hours at 30° C. at a place shielded from the light; thereafter using a high-speed centrifugal separator (operated at 5,000 r.p.m.), the aqueous solution and the residue were separated. In the same manner as above, the residue was subjected to water immersion three times.

Next, all of the aqueous solutions collected were concentrated by the conventional lyophilization until water was substantially removed.

Then, this concentrated aqueous solution was poured into as much ethanol solution at 25° C., in which picric acid had been dissolved by ethanol at a ratio of 1:4; the mixture was well shaken and then left in quiet standing for 24 hours at 15° C. in a place shielded from the light.

The precipitate obtained after quiet standing was filtered and the filterate was mixed with hydrated acetone composed of acetone 3 parts to water 3 parts, 10 times as much by weight as the precipitate. After full shaking, the mixture was left in quiet standing for 12 hours.

Recrystallized matter yielded through quiet standing was removed by filtration and 0.205 part of the recrystallized matter was suspended in 36 parts in weight of dilute hydrochloric acid of 5% concentration and after dissolving, mixed with 300 parts of water. 250 ml. of ether was added to the solution; and after full shaking, the mixture was left in quiet standing for 30 minutes in a cool, dark place.

Thereupon, the mixture was separated by a separating funnel into ether and aqueous solution; 250 ml. of ether was added to the aqueous solution and after full shaking, the mixture was again left in quiet standing for 30 minutes in a cool, dark place and again the separation into ether and aqueous solution by means of a separating funnel was repeated to give an aqueous solution. This step of ether prepration was repeated four times.

The aqueous solution thus obtained was mixed with citric acid in the mol weight (0.0926 g.) corresponding to the mol weight of Bufotenidine; this was followed by full shaking, and then the solution was again mixed with sodium hydrogen carbonate in the same mol weight (5.179 g.) as the hydrochloric acid in said aqueous solution, and blended well to dissolve.

Next, the resulting aqueous solution was evaporated and dried in a nitrogen stream at 20° C., shielded from the light under reduced pressure, thereby yielding 3.772 g. of the end product which contains 0.1 g. of Bufotenidine.

EXAMPLE 2

Fine particles of 100 parts by weight of the crude drug *Bufonis venenum* were immersed at 30° C. for 8 hours in 22 times as much by weight of ethyl acetate of Class 1 Reagent quality; in the meantime the same amount of ethyl acetate at the same temperature was renewed twice.

Next, using a centrifugal separator, the solution and the residue were separated; the residue was treated in the same way as above twice to prepare the ethyl acetate-solubles.

The insoluble residue thus obtained was mixed with chloroform of Class 1 Reagent quality in an amount 10 times as much by weight as the residue and the immersion in this state lasted 12 hours at 25° C. After immersion, the chloroform and the chloroform-insoluble residue were separated by filtering; the separated residue was washed with 5 times as much by weight of chloroform as the residue and thereafter placed in a depressured still at 30° C. to distill the chloroform under reduced pressure.

The chloroform-insoluble residue thus obtained was immersed in 25 times as much by weight of Class 1 Reagent methanol as the residue, the immersion lasting 12 hours at 25° C. After immersion, using a centrifugal separator, methanol and the methanol-insoluble residue were separated by a centrifugal separator; and preparation of the residue was repeated twice in the same manner.

All the methanol preparations were gathered in a depressured still to distill methanol at 25° C. under reduced pressure of 5 mm. Hg, thereby yielding a methanol preparation.

Next, the thus obtained methanol preparation was immersed in 100 parts by weight of Special Class Reagent acetone at 25° C. for 4 hours, during which time the same amount of acetone at the same temperature was renewed three times.

All the acetone-insoluble residues were then collected in a depressured still to distill any remaining acetone at 25° C. under a reduced pressure of 10 mm. Hg.

This residue was then immersed in 5 times as much by weight of water as the preparation and left at 25° C. in a light-shielded place for 2.5 hours, after which time it was separated into aqueous solution and residue by a high-speed centrifugal separator; the residue was subjected to the same water immersion as above 4 times. Then all the aqueous solutions were concentrated in a 25° C. nitrogen stream under a reduced pressure of 5 mm. Hg.

Next, a 25° C. hot ethanol solution with 1 part picric acid to 4 parts ethanol in the same amount as the above concentrated aqueous solution was blended therewith and agitated, after which it was left in quiet standing for 48 hours at 20° C. in a light-shielded place. The precipitate resulting from quiet standing was filtered, mixed with hydrated acetone of 3 parts acetone to 7 parts water in an amount 12 times as much by weight as the precipitate; well shaken and then left in quiet standing for 24 hours.

Recrystallized matter resulting from quiet standing was filtered, mixed with dilute hydrochloric acid of 5% concentration in 45 weight parts per 0.205 part of said recrystalized matter and when dissolved, mixed with 300 parts water; and the resulting suspension of said recrystallized matter in dilute hydrochloric acid was mixed with 300 ml. of ether; well shaken and then left in quiet standing for one hour in a cool, dark place.

Next, using a separatory funnel, the ether and the aqueous solution were separated; the aqueous solution was mixed with 250 ml. of ether; shaken well and then left in quiet standing for 30 minutes in a cool, dark place; and again using a separatory funnel, the aqueous solution was separated from the ether. This step of repeated ether preparation was performed three times. The thus obtained aqueous solution was mixed with the same mol weight (12.956 g.) of citric acid as 45 weight parts of 5% concentration dilute hydrochloric acid; shaken well; mixed again with the same mol weight (5.179 g.) of sodium hydrogen carbonate as the hydrochloric acid in the aqueous solution; and blended well to dissolve.

Then the aqueous solution was dried by lyophilization, yielding 15.544 g. of end product which contains 0.1 g. Bufotenidine.

The difference in yield of the end product between Example 1 and Example 2 is attributable to the difference in the coexistence content of citric acid.

The substance obtained according to the method of the invention is white crystalline powder which represents a composition of Bufotenidine, citric acid and sodium chloride; it is easy to dissolve in water and has no flavor.

This substance after two years of storage in dry, dark condition can exhibit a residual efficacy of about 80%; thus it has a relatively high stability (as verified by the light absorption method, the coloration method and the bioassay).

With little loss during production, this substance can be prepared efficiently and economically from the crude drug *Bufonis venenum*.

What is claimed is:
1. A method for the preparation of an acidic citrate of a compound of the formula

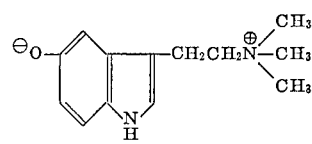

from fine particles of the crude drug *Bufonis venenum* comprising
 (a) immersing said fine particles with ethyl acetate for at least six hours at room temperature;
 (b) immersing the residue separated from said ethyl acetate with from about 15 to about 25 parts of an alcohol at a temperature below 40° C.;
 (c) immersing the residue of the resultant alcoholic solution in water at room temperature in an atmosphere devoid of light for 1–3 hours;
 (d) removing the residue from the resultant aqueous solution and adding to said aqueous solution an alcoholic solution of picric acid at a temperature of 15° to 40° C., the resultant mixture thereafter standing in a cool atmosphere devoid of light for at least 24 hours;
 (e) collecting the resulting precipitate of (d) and adding thereto a solution of dilute hydrochloric acid, thereafter adding an ether solution thereto and allowing the resultant mixture to stand quietly;
 (f) separating the ether phase from the mixture of (e) to yield an aqueous solution, to which are successively added citric acid and sodium hydrogen carbonate; and
 (g) removing the water from the resultant solution to yield said acidic citrate.

2. Method according to claim 1, in which the step (a) includes at least two renewals of ethyl acetate.

3. Method according to claim 1, in the step (c) in which water is renewed at least three times.

4. Method according to claim 1, in the step (e) in which the dilute hydrochloric acid has a concentration of 4–6% and an ether of Special Class quality is employed.

5. Method according to claim 1, in the step (f) in which the aqueous solution separated from the ether is subjected at least three times to ether preparation.

6. Method according to claim 1, in the step (g) in which water removal from the solution is accomplished by lyophilization.

7. Method according to claim 1, wherein the following steps are added between the step (a) and the step (b): immersing the residue separated from said ethyl acetate in chloroform of higher than Class 1 Reagent quality in an amount at least 5 times as much by weight as that of the residue; allowing the immersion to stand quietly for at least 6 hours; filtering the solution and evaporating chloroform from the chloroform-insoluble residue; immersing the obtained residue for at least 2 hours at a temperature less than 30° C. in acetone of higher than Class 1 Reagent quality in approximately the same amount as the crude *Bufonis venenum*, renewing at least twice the acetone in the same amount at the same temperature; and removing any residual acetone from all of the acetone insoluble residue.

8. Method according to claim 1 wherein between the step (d) and the step (e) are added the following steps: adding to the precipitate resulting from step (d) Special Class Reagent acetone in approximately the same amount as the crude *Bufonis venenum;* continuing immersion at a temperature of less than 30° C. for at least two hours; renewing the acetone at least twice in the same amount at the same temperature; and collecting recrystallized matter from all of the acetone solutions.

References Cited

UNITED STATES PATENTS 1,951,870  3/1934  Jensen et al. _____ 424—98

ALEX MAZEL, Primary Examiner

J. A. NARCAVAGE, Assistant Examiner

U.S. Cl. X.R.

424—274